(12) United States Patent
Cansancio et al.

(10) Patent No.: US 8,903,122 B2
(45) Date of Patent: Dec. 2, 2014

(54) VERIFYING A SLIDER TRAY MAP

(71) Applicant: HGST Netherlands B.V., Amsterdam (NL)

(72) Inventors: Justice D. Cansancio, Santa Rosa (PH); Mark Lven T. Palejaro, Tacloban (PH); Luis A. Pelo, Rosa City (PH); Quintin L. Rullan, Jr., Muntinlupa (PH); Rufino F. Sadiasa, Jr., Amadeo (PH)

(73) Assignee: HGST Netherlands B.V., Amsterdam (NL)

( * ) Notice: Subject to any disclaimer, the term of this patent is extended or adjusted under 35 U.S.C. 154(b) by 132 days.

(21) Appl. No.: 13/842,255

(22) Filed: Mar. 15, 2013

(65) Prior Publication Data

US 2014/0270333 A1  Sep. 18, 2014

(51) Int. Cl.
*G06K 9/00* (2006.01)
(52) U.S. Cl.
CPC .................. *G06K 9/00624* (2013.01)
USPC ...... 382/100; 382/141; 382/152; 361/679.33; 361/679.37
(58) Field of Classification Search
USPC .......................... 382/141, 145, 149, 152, 153; 361/679.33, 679.37
See application file for complete search history.

(56) References Cited

U.S. PATENT DOCUMENTS

| | | | |
|---|---|---|---|
| 5,240,866 A | 8/1993 | Friedman et al. | |
| 5,568,408 A | 10/1996 | Maeda | |
| 6,353,312 B1 | 3/2002 | Farnworth et al. | |
| 6,728,190 B2 * | 4/2004 | Huang et al. | 720/662 |
| 7,017,257 B2 | 3/2006 | Lelong | |
| 7,127,799 B2 | 10/2006 | Girard et al. | |
| 7,165,462 B2 | 1/2007 | Luo et al. | |
| 7,170,742 B2 * | 1/2007 | Na et al. | 361/679.32 |
| 7,254,822 B2 * | 8/2007 | Chiu | 720/707 |
| 7,288,935 B2 | 10/2007 | Farren et al. | |
| 7,404,796 B2 * | 7/2008 | Ginsberg | 600/365 |
| 7,430,750 B2 * | 9/2008 | Lee et al. | 720/648 |
| 7,464,456 B2 | 12/2008 | Fujii et al. | |
| 7,640,131 B2 | 12/2009 | Ono et al. | |
| 7,723,982 B2 | 5/2010 | Sasaki et al. | |
| 8,302,115 B2 * | 10/2012 | Ou et al. | 720/650 |
| 8,529,175 B2 * | 9/2013 | Edwards et al. | 410/49 |

OTHER PUBLICATIONS

Tongsomporn, Damrongsak et al., An Investigation of Row-Bar Level Quasi-Static Test for Perpendicular Recording, Jul. 2007, pp. 1533-1539, vol. E90-C, The Institute of Electronics, Information and Communication Engineers, Tokyo, Japan.

Amer, Ahmed et al., Design Issues for a Shingled Write Disk System, Proceedings of the 2010 IEEE 26th Symposium on Mass Storage Systems and Technologies, 2010, pp. 1-12, IEEE Computer Society, Washington, DC, United States.

* cited by examiner

*Primary Examiner* — Yosef Kassa
(74) *Attorney, Agent, or Firm* — Patterson & Sheridan, LLP

(57) ABSTRACT

A hard disk drive manufacture process may use a database to track the sliders stored within a slider tray. Instead of requiring an operator to visually inspect each tray to confirm that the database information is accurate, the trays may be sent to a detection system that uses a computer vision technique to identify the total number of sliders in a tray. In one embodiment, the computer vision technique may also determine where the sliders are stored in the slider tray—e.g., a particular row and column. If the information obtained using the computer vision technique differs from the information stored in the database, the system may perform one or more actions for correcting the discrepancy. In this manner, the computer vision technique may be used to update and confirm the slider tracking information stored in the database.

20 Claims, 10 Drawing Sheets

VERIFYING A SLIDER TRAY MAP

BACKGROUND OF THE INVENTION

1. Field of the Invention

Embodiments of the present invention generally relate to manufacturing sliders in hard disk drives, or more specifically, to tracking individual sliders stored in a slider tray.

2. Description of the Related Art

When manufacturing hard disk drives, a plurality of sliders are typically manufactured on a common substrate—e.g., a semiconductor wafer. Each slider includes, among other things, a transducer for writing data to a magnetic disk and a sensor for reading data from the magnetic disk. After creating the sliders, the common substrate may be diced into rows that include a subset of the sliders. Further manufacture techniques may be performed such as, for example, lapping the subset of sliders to form an air bearing surface (ABS).

Eventually, the sliders are separated and placed into a slider tray for further testing. Once the testing is complete, the sliders may be removed from the tray, attached to suspension arms, and integrated into a hard disk drive. Because knowing the precise number of sliders in the slider tray may indicate the total number of hard disk drives that can be manufactured, it is desirable to know the number of sliders in each tray by maintain a mapping of the sliders in a slider tray. Accurately tracking the location of the sliders in the tray using the trap map may affect downstream fabrication steps. For example, slider dynamic electrical testers may use the tray map to identify where to pick up and place the sliders. If a slider is physically present on the tray but does not exist in the tray maps, the slider will not be picked up and tested. Conversely, if a slider is missing on the tray but has an entry in the tray map, the testers will waste time attempting to pick up a non-existing slider at the position identified by the map. However, manually counting the sliders stored in each tray to confirm the information in the tray map may lead to an unreliable result and be an inaccurate indicator of unit production capability.

SUMMARY OF THE INVENTION

Embodiments of the present invention describe a method and a non-transitory computer-readable storage medium for tracking a disk drive component. The method and computer-readable storage medium generate a template using a first tray that is not currently storing any disk drive components where the first tray comprises a plurality of apertures configured for respectively storing an individual disk drive component. The method and computer-readable storage medium receive an image of a second tray that contains one or more disk drive components and determine a number of disk drive components stored in the second tray by comparing the received image to the template. The method and computer-readable storage medium compare the determined number of disk drive components to a disk drive quantity stored in a database entry associated with the second tray. Upon determining that the number of disk drive components is different than the disk drive quantity, the method and computer-readable storage medium select an action that, when performed, updates the database entry.

Another embodiment of the present invention describes a system for tracking disk drive components. The system includes a first tray that is not currently storing any disk drive components where the first tray comprises a plurality of apertures configured for respectively storing an individual disk drive component. The system also includes a second tray storing at least one of the disk drive components. The system includes an image capturing device configured to capture digital images of the first tray and second tray and a computer vision module that receives the digital images. The computer vision module is configured to generate a template using a digital image of the first tray and determine a number of disk drive components stored in the second tray by comparing the received image to the template. The computer vision module is also configured to compare the determined number of disk drive components to a disk drive quantity stored in a database entry associated with the second tray. Upon determining that the number of disk drive components is different than the disk drive quantity, the computer vision module is configured to select an action that, when performed, updates the database entry.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

To facilitate understanding, identical reference numerals have been used, where possible, to designate identical elements that are common to the figures. It is contemplated that elements disclosed in one embodiment may be beneficially utilized on other embodiments without specific recitation.

DETAILED DESCRIPTION

In the following, reference is made to embodiments of the invention. However, it should be understood that the invention is not limited to specific described embodiments. Instead, any combination of the following features and elements, whether related to different embodiments or not, is contemplated to implement and practice the invention. Furthermore, although embodiments of the invention may achieve advantages over other possible solutions and/or over the prior art, whether or not a particular advantage is achieved by a given embodiment is not limiting of the invention. Thus, the following aspects, features, embodiments and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

The present disclosure uses a computer vision technique for tracking and monitoring the number of sliders in a disk drive manufacturing process. When manufacturing disk drives, a plurality of sliders may be stored in a slider tray. After the sliders have been diced into separate components, the tray is a convenient tool with which to transport the sliders. Moreover, in one embodiment, the slider trays as well as the number and location of the sliders in the tray may be tracked using an inventory database. The database may include an entry for each tray that includes the number of sliders stored on the tray and their respective locations (e.g., row and column). Thus, an operator may query the database to determine how many sliders are currently stored in the slider trays.

However, the information stored in the database may be inaccurate. Instead of requiring an operator to visually inspect each tray to confirm that the database information is accurate, the trays may be sent to a detection system that uses a computer vision technique to identify the total number of sliders in a tray. In one embodiment, the computer vision technique may also determine where the sliders are stored in the slider tray—e.g., a particular row and column. If the information obtained using the computer vision technique differs from the information stored in the database, the system may perform one or more actions for correcting the discrepancy. For example, if an entry in the database indicates that a tray should have a slider located at row 1, column 2 but the computer vision technique indicates that this location is actually empty, the entry may be updated to reflect that the slider has been removed. In this manner, the computer vision technique may be used to update and confirm the slider tracking information stored in the database.

An Exemplary Hard Drive

Figure 1:
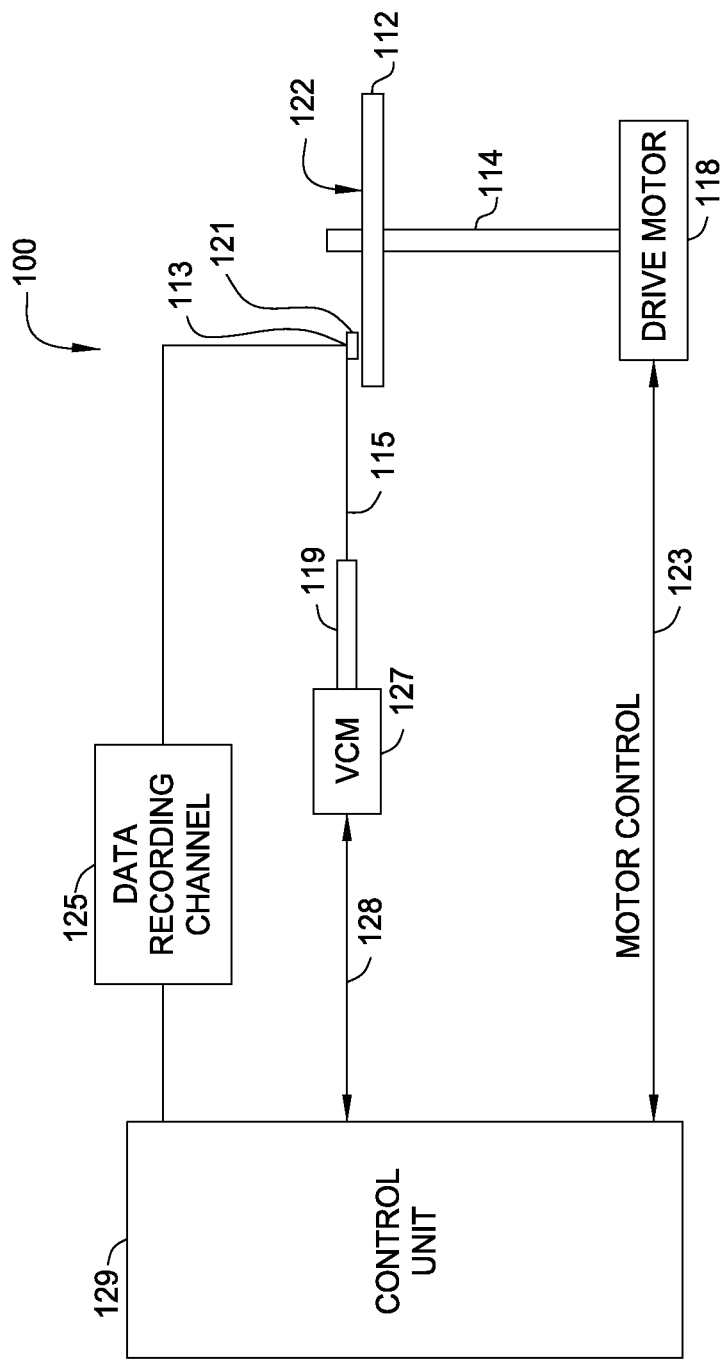
FIG. 1 illustrates a disk drive system, according to an embodiment described herein.

FIG. 1 illustrates a disk drive 100 embodying this invention. As shown, at least one rotatable magnetic disk 112 is supported on a spindle 114 and rotated by a disk drive motor 118. The magnetic recording on each disk is in the form of annular patterns of concentric data tracks (not shown) on the magnetic disk 112.

At least one slider 113 is positioned near the magnetic disk 112, each slider 113 supporting one or more magnetic head assemblies 121. As the magnetic disk rotates, the slider 113 moves radially in and out over the disk surface 122 so that the magnetic head assembly 121 may access different tracks of the magnetic disk 112 where desired data is written. Each slider 113 is attached to an actuator arm 119 by way of a suspension 115. The suspension 115 provides a slight spring force which biases the slider 113 against the disk surface 122. Each actuator arm 119 is attached to an actuator means 127. The actuator means 127 as shown in FIG. 1 may be a voice coil motor (VCM). The VCM comprises a coil movable within a fixed magnetic field, the direction and speed of the coil movements being controlled by the motor current signals supplied by control unit 129.

During operation, the rotation of the magnetic disk 112 generates an air bearing between the slider 113 and the disk surface 122 which exerts an upward force or lift on the slider 113. The air bearing thus counter-balances the slight spring force of suspension 115 and supports slider 113 off and slightly above the disk 112 surface by a small, substantially constant spacing during normal operation.

The various components of the disk drive 100 are controlled in operation by control signals generated by control unit 129, such as access control signals and internal clock signals. Typically, the control unit 129 comprises logic control circuits, storage means and a microprocessor. The control unit 129 generates control signals to control various system operations such as drive motor control signals on line 123 and head position and seek control signals on line 128. The control signals on line 128 provide the desired current profiles to optimally move and position slider 113 to the desired data track on disk 112. Write and read signals are communicated to and from write and read heads on the assembly 121 by way of recording channel 125.

The above description of a typical magnetic disk storage system and the accompanying illustration of FIG. 1 are for representation purposes only. It should be apparent that disk storage systems may contain a large number of disks and actuators, and each actuator may support a number of sliders.

Calibrating an Automated Computer Vision System

Figure 2:
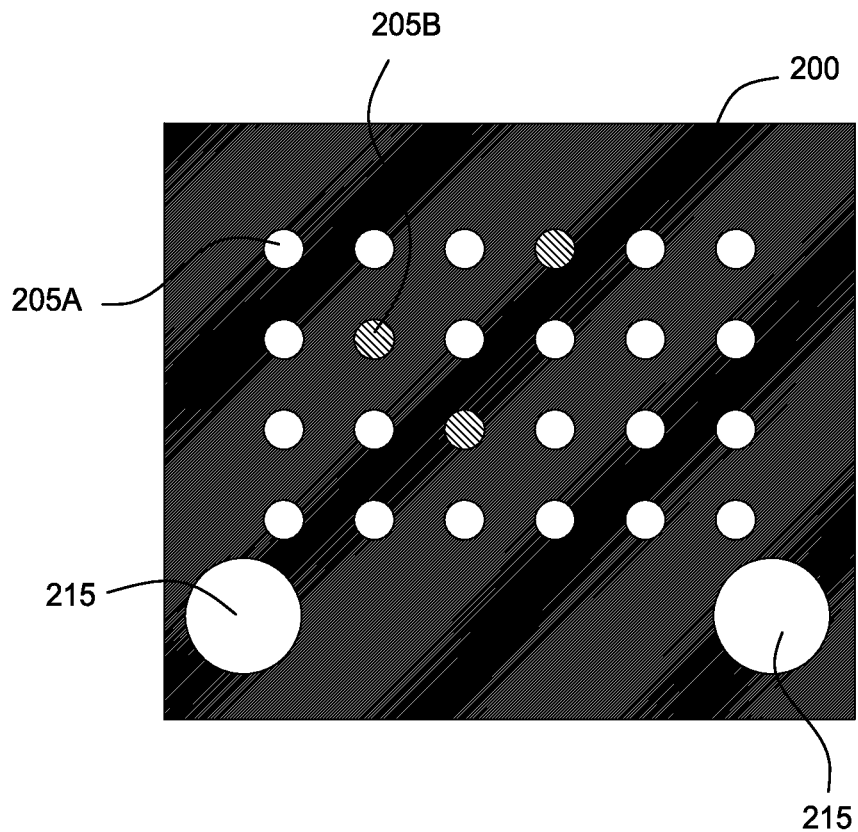
FIG. 2 illustrates a slider tray, according to an embodiment described herein.

FIG. 2 illustrates a slider tray 200, according to an embodiment described herein. Tray 200 includes a plurality of apertures 205 (herein referred to as pockets 205) adapted to hold individual sliders (not shown). On a front side of tray 200 (the side shown in FIG. 2), the pockets 205 may have an opening that permits a slider to be deposited inside the pocket 205. In one embodiment, the openings are approximately 600 microns in diameter. A back side of the tray may be composed of a transparent material (e.g., glass) or be thin enough that light is able to travel from the back side of the tray 200 to the front side via the pockets 205. Alternatively, the back side may also have holes and rely on, for example, a conical shape to prevent the sliders from falling out the back side. Thus, in either case, when a light source is disposed at the back side of the slider tray 200, the light illuminates the pockets 205 relative to the portion of the tray 200 that does not include a pocket 205 (e.g., the dark grey portion shown in FIG. 2). Moreover, the light source may illuminate a pocket 205 differently depending on whether the pocket 205 does or does not contain a slider. For comparison, slider tray 200 contains empty pockets (e.g., pocket 205A) that do not contain a slider and occupied pockets (e.g., pocket 205B) that currently store a slider. Generally, an occupied pocket 205B permits less light (as represented by the darker gray coloration) to pass through the pocket than empty pockets 205A. Accordingly, not only is the slider tray 200 a convenient tool for transporting a plurality of sliders in respective pockets 205, the slider tray 200 may enable a human or computer vision application to determine which pockets 205 currently contain a slider.

In one embodiment, the slider tray 200 includes one or more reference positions 215 which may be used to align a computing vision system to a particular orientation of the tray. As shown, the reference positions 215 have a visual characteristic (e.g., size, shape, opacity, etc.) that is different from a similar characteristic of the pockets. In this example, the reference positions 215, much like the pockets 205, may include an opening in the front side that forms an aperture to the transparent back side of the tray 200. However, the diameter of the reference position 215 may be greater than the diameter of the pockets 205 so that the computing vision system can distinguish the reference positions 215 from the pockets 205. This function will be discussed in greater detail below.

In one embodiment, additional testing may be performed while the sliders are held in the pockets of the tray 200. After this testing is complete, the sliders may be removed from the tray 200 and mounted on a suspension arm as discussed in FIG. 1. Although the present embodiments discuss storing sliders in the pockets 205, the disclosure is not limited to such. Instead, any type of component used in manufacturing a disk drive may be stored in the pockets 205 and accounted for using the techniques discussed below.

Figure 3:
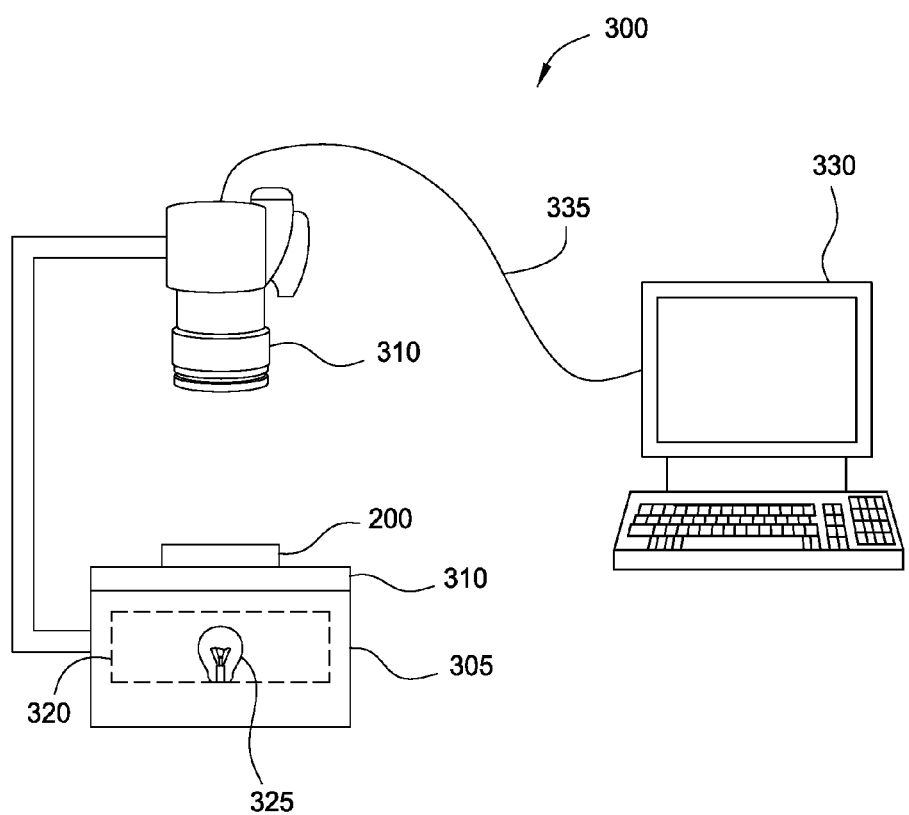
FIG. 3 illustrates a detection system for identifying the quantity and location of sliders in a slider tray, according to an embodiment described herein.

FIG. 3 illustrates a detection system 300 for identifying the quantity and location of sliders in a slider tray 200, according to an embodiment described herein. The system 300 includes a computing system 330, a image recording device 310, and a mount 305 configured to hold the slider tray 200 (shown from the side). As shown by the cutout 320, mount 305 includes a light source 325 (e.g., a fluorescent or incandescent bulb, LED, and the like) while illuminate the back side of the slider tray 200. The top surface 310 of the mount 305 on which the tray 200 rests may be transparent to permit the light from the light source 325 to reach the tray 200. As discussed above, the slider tray 200 may include a plurality of pockets that permit the light from the light source 325 to illuminate portions of the front side of the tray 200 greater than portions the tray 200 that do not include the pockets. This difference in illumination may be detected by the image recording device 310.

In one embodiment, the mount 305 may be physically coupled to the image recording device 310 to improve stability but this is not a requirement. Generally, the image recording device 310 captures images of the tray 200. These images are then transmitted to the computing system 330 via the communication channel 335 which can use either a wireless or a wired communication method. Alternatively, a captured image may be loaded onto a storage device (e.g., a Flash drive) which is then plugged into the computing system 330 by an operator.

Computing system 330 may include a computer vision module that parses the captured image. Based on the illumination emitted from the front side of the tray 200, the computer vision module may identify portions of the tray 200 that include a pocket and portions of the tray 200 that do not. Moreover, in one embodiment, the computer vision module is configured to identify the difference between pockets that are empty versus pockets that contain a slider. By identifying the pockets and determining if the pockets are empty or occupied, the computer vision module is able to count the number of sliders stored in tray 200. In addition to identifying the total number of sliders stored in a tray 200, in one embodiment, the computer vision module is configured to identify a location of each slider within the tray. As will be described later, the location information of each slider may then be compared to location information stored in an inventory database. If the location information conflicts, the database may be update to accurately reflect the true number of sliders in the tray or the current location of the slider.

In one embodiment, the detection system is calibrated using an empty tray—i.e., a tray that does not currently store sliders. For example, the mount on which the tray rests may have a guide or locking members that orient the slider tray in a particular orientation. This orientation may not align precisely with the orientation of the image capturing device—e.g., the tray is skewed in the images captured by the device. Instead of having to manually adjust the camera to ensure proper orientation, the detection system may be calibrated. Moreover, the result of calibration may yield a template of an empty slider tray that is then compared to images of trays that do contain sliders.

Figures 4A, 4B:
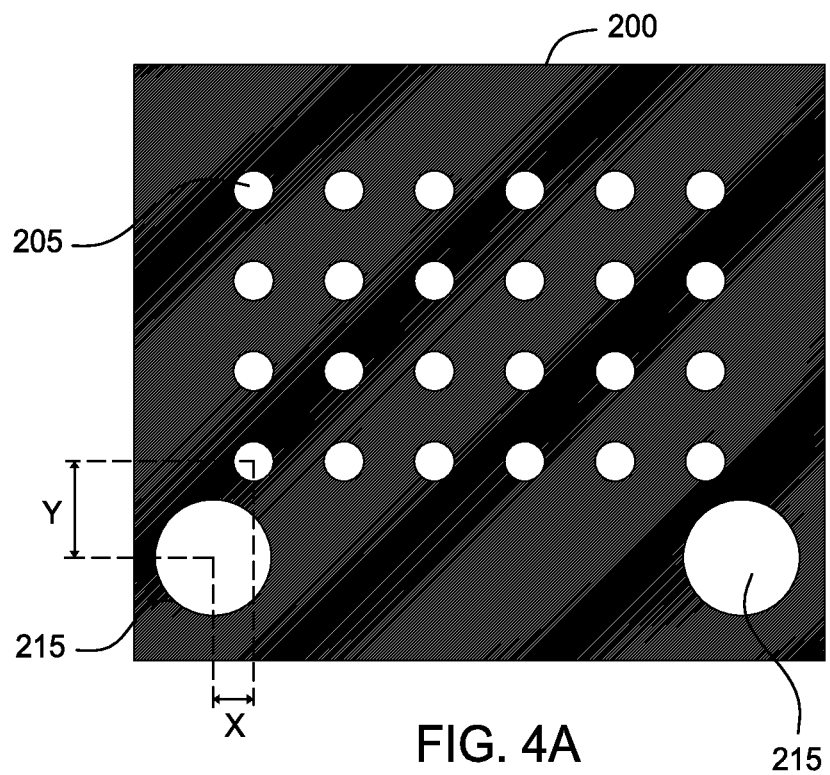
FIGS. 4A-4B illustrate calibrating the detection system using reference positions, according to embodiments described herein.

FIGS. 4A-4B illustrate calibrating the detection system using reference positions, according to embodiments described herein. Specifically, FIG. 4A illustrates an empty slider tray 200 that includes a plurality of pockets 205 and reference positions 215. In one embodiment, the tray 200 may be back lit such that the pockets 205 and reference positions 215 have a greater luminance (or brightness) than other portions of the tray 200. Thus, an image capturing device facing the front side of the tray may record the contrast in luminance between the different regions of the tray 200. The computer vision module may process this image to identify the location of the pockets 205 and the reference positions 215. Moreover, because the reference positions 215 have a different visual characteristic than the pockets 205 (e.g., a larger diameter), the computer vision module is able to distinguish between reference positions 215 and pockets 205. For example, in the captured image, the tray 200 may be skewed—i.e., slightly rotated such that the tray's edges do not align with the edges of the image—because of the orientation of a mount on which the tray 200 rests is different than the orientation of the image capturing device. Nonetheless, the computer vision module may use the reference positions 215 to identify and account for this skew. Assuming the mount includes a fastening element or a guide that ensure each tray 200 has the same orientation, the computer vision module can account for the skew when subsequent trays are placed on the mount. Thus, each time the computer vision module receives a capture image, the module may, for example, rotate the image to remove the skew.

In addition to using the reference positions 215 to remove any skew between the tray 200 and the image capturing device, the computing vision module may use a predetermined horizontal and vertical offsets to identify the location of the pockets. Here, these offsets are in the x and y directions. For example, after the computer vision module identifies the center of reference position 215, the module may use the horizontal and vertical offsets to identify the expected position of the pocket 205 closest to reference position 215. However, because of variances in manufacturing the trays 200, the expected center location of the closest pocket 205 may not be precisely align with the actual center of the pocket 205. Nonetheless, the horizontal and vertical offsets provide an accurate estimate of the pocket's location.

Alternatively, the skew may be accounted for without rotating the image. Using a trigonometry function, the two reference positions 215 may be used to identify the skew angle. Based on this measured skew angle, the predetermined offsets between rows and columns, and the distance one of the reference position 215 and an identified pocket 205, the computer vision module may use one or more trigonometry functions to assign coordinates to each pocket 205 in the tray 200. In another embodiment, the computer vision module may use geometry to assign coordinates to the pockets 200.

FIG. 4B illustrates dividing the tray 200 into a plurality of rows and columns. After determining the estimated location of the pocket closest to the reference position, the computer vision module may use row and column offsets to divide the tray 200 into a plurality of rows and columns as shown in FIG. 4B. The column offset may be the distance between the centers of pockets 205 in adjacent columns while the row offset is the distance between the centers of pockets 205 in adjacent rows. Like the horizontal and vertical offsets shown in FIG. 4A, the column and row offsets may also be provided by the tray's manufacture. To account for variances in manufacturing, the offsets may be used to identify a region where the actual pocket is expected to reside within. The rows and columns define respective regions that should include the various pockets even if the pockets may not align precisely within the rows and columns.

Figure 5A:
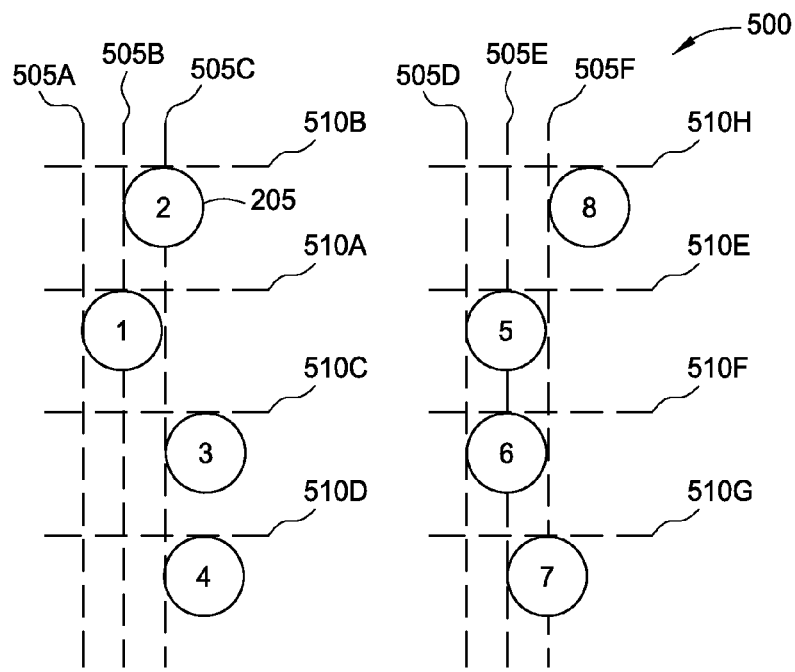
FIGS. 5A-5C illustrate identifying pocket locations in the slider tray, according to embodiments described herein.
Figure 5B:
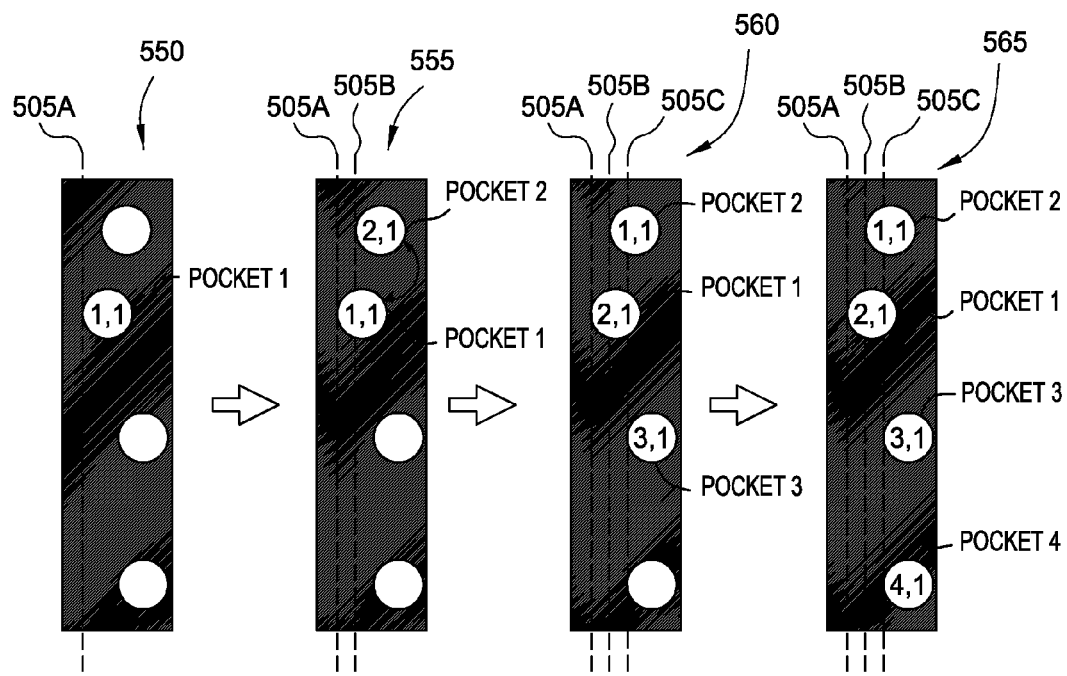
Figure 5C:
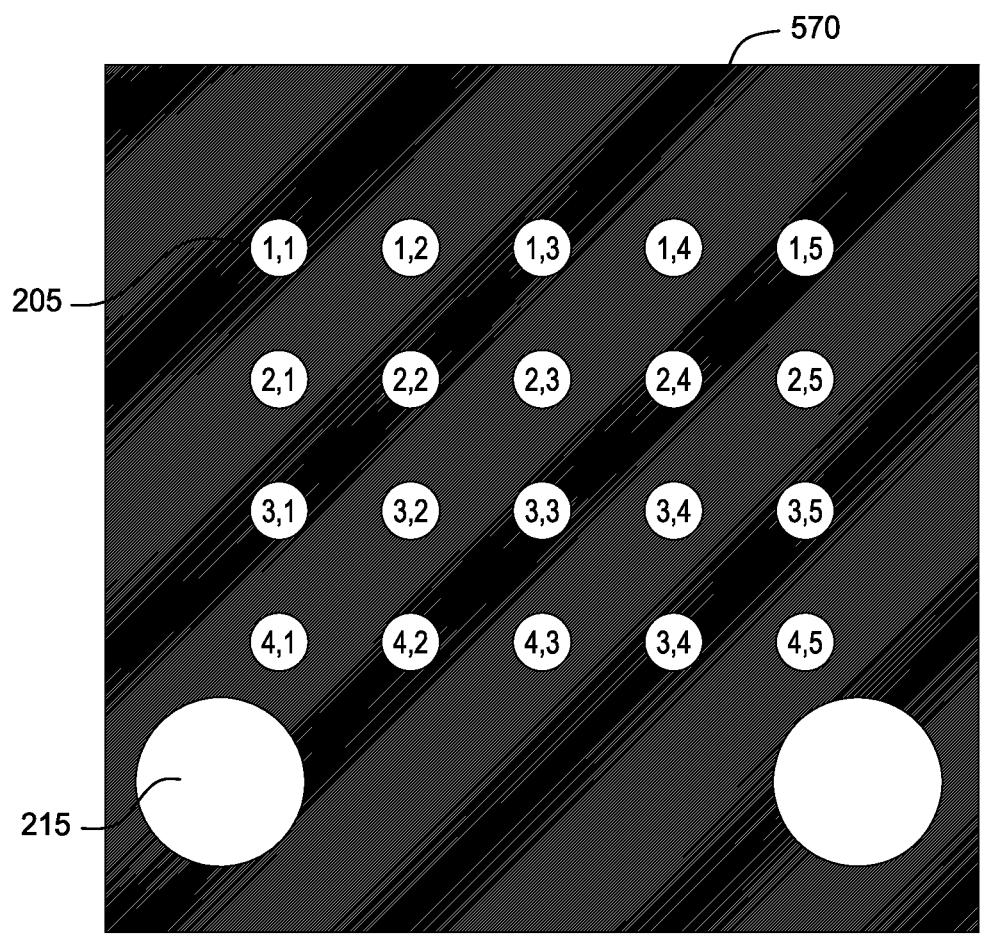

FIGS. 5A-5C illustrate identifying pocket locations in the slider tray, according to embodiments described herein. In one embodiment, instead of relying on only an estimated location of pockets derived using the predetermined offsets, the computer vision module may scan within the areas defined by the rows and columns to identify the actual location of the pockets. As shown, FIG. 5A is captured image 500 showing misaligned pockets 205 resulting from variance in the tray manufacturing process. Specifically, the image 500 illustrates the arrangement of the pockets 205 from the first and second columns shown FIG. 4B. Here, the vertical and horizontal displacements of the pockets 205 vary. That is, the vertical or horizontal spacing between adjacent pockets 205 in the same column or row may change. Accordingly, the pockets 205 may not align precisely within a row or column. Thus, the predefined offsets provided by the tray manufacture may not accurately identify a precise location of the pockets.

To identify the actual location of the pockets, the computer vision module may raster through the captured image starting from the left side of the image 500 and moving to the right side until it identifies a pocket 205 in the image. Specifically, the computer vision module may move in predefined intervals from left to right, and at each interval, search from top to bottom. In one embodiment, the computer vision module starts from the left of the captured image 500 and moves to the right until the module first identifies a pocket in the image. To identify a pocket, the computer vision module may evaluate the luminance of each pixel in the captured image. Generally, pixels associated with the pockets have a greater luminance value than pixels associated with tray portions that do not have a pocket or reference position. Dotted line 505A represents the first time the computer vision module detects a pocket 205 when rastering from left to right while dotted line 510A illustrates the first time the module detects a pocket 205 when scanning from top to bottom along the dotted line 505A. That is, because Pocket 1 is the furthest left, the computer vision module detects this pocket 205 first. After identifying Pocket 1 and because no other pockets 205 are located along the dotted line 505A, the computer vision module shifts to the right to again scan the pixels from top to bottom. After one or more shifts to the right, the computer vision module detects Pocket 2 as shown by dotted line 505B and 510B. Again, because no other pockets are located along dotted line 505B, the computer vision module would shift to the right to identify additional pockets. However, once the computer vision module scans from the top of the image 500 to the bottom along the dotted line 505C, the module first detects Pocket 3 (at dotted line 510C) before it detects Pocket 4 (at dotted line 510D). The computer vision module may continue to this process for all the other columns of pockets 205 in the captured image. The pocket numbers represent the order in which the computer vision module detects the pockets based on the rastering technique described above.

In addition to locating the pockets, the computer vision module may assign the pockets to a particular location as the pockets are detected. FIG. 5B illustrates a technique for assigning the location using a row and column value. The first pocket detected (i.e., Pocket 1 of FIG. 5A) is assigned to row 1, column 1 as shown in image 550. The second pocket detected (Pocket 2) is then assigned to row 2 column 1 as shown in image 555. For example, because the distance between dotted line 505A and dotted line 505B is less than a predefined column offset (i.e., the predefined estimated distance between columns of pockets), the computer vision module determines that Pocket 1 and Pocket 2 are in the same column. However, the initial row assignment is incorrect. To correct this initial assumption, the computer vision module may perform a bubble sort each time a new pocket is detected in a column. Because Pocket 2 is closer to the top of the column than Pocket 1, the computer vision module switches the assignments as shown by image 560 such that Pocket 1 is in row 2, column 1 and Pocket 2 is in row 1, column 1. Moreover, the computer vision image detects Pocket 3 and performs the bubble sort again. However, because the assumption that Pocket 3 should be assigned to row 3, column 1 is correct, the bubble sort does not change the assignments.

However, assume that Pocket 3 was located above Pocket 2 in the column shown. In this example, the bubble sort would switch the row and columns assignments for all three pockets. That is, the computer vision module first switches Pocket 3's assignment—(3, 1)—with Pocket 2's assignment—(1, 1). Next, the vision module switches Pocket 2's assignment—(3, 1)—with Pocket 1's assignment—(2, 1). At the end of the bubble sort, Pocket 1 would be assigned to (3, 1), Pocket 2 to (2, 1) and Pocket 3 to (1, 1).

Returning to the example shown in FIG. 5B, image 565 illustrates that the computer vision module detects the last pocket in the row—Pocket 4—and correctly assign it to row 4 column 1, and thus, performing a bubble sort does not change the row assignment. In this manner, the bubble sort corrects any improper row assignments in a column as each new pocket is detected. Although not shown in FIG. 5B, the computer vision module may then continue to shift to the right until the module detects a pocket in the second column. In one embodiment, the computer vision module may compare the horizontal offset between the previously detected pocket—i.e., Pocket 4—and the newly detected pocket—i.e., Pocket 5—to the estimated column areas found in FIG. 4B. Specifically, the computer vision module may, using the column and row map shown in FIG. 4B, determine that Pockets 1-4 are within the area assigned to Column 1 while Pocket 5 is located in the area assigned to Column 2. The computer vision module may then perform a similar technique for assigning row values to the pockets in Column 2 as shown by vertical lines 505D-505F and horizontal lines 510E-510-H in FIG. 5B.

Although FIGS. 5A and 5B describe rastering through a captured image in a right-to-left and top-to-bottom manner where bubble sort is used confirm the row assignments, the present disclosure is not limited to such. For example, the computer vision module may instead raster through the captured image from top-to-bottom and from right-to-left where bubble sort (and the predefined row offset) is used to confirm the column assignments rather than the row assignments. One of ordinary skill will recognize the different computer vision detection schemes, including different rastering and sorting techniques, which may be used to detect objects in a captured image and assign a location to those objects.

FIG. 5C illustrates a digital template 570 resulting from performing the vision detection technique shown in FIGS. 5A and 5B. Each pocket 205 is assigned to a particular row and column which may be then correlated to a slider located within the pocket. For example, not only does the template 570 identify the total number of sliders that can be stored in the pockets (i.e., the total number of pockets), the template 570 assigns a specific row and column value to each pocket 205 within the tray.

Determining the Location of Sliders in a Slider Tray

Figure 6A:
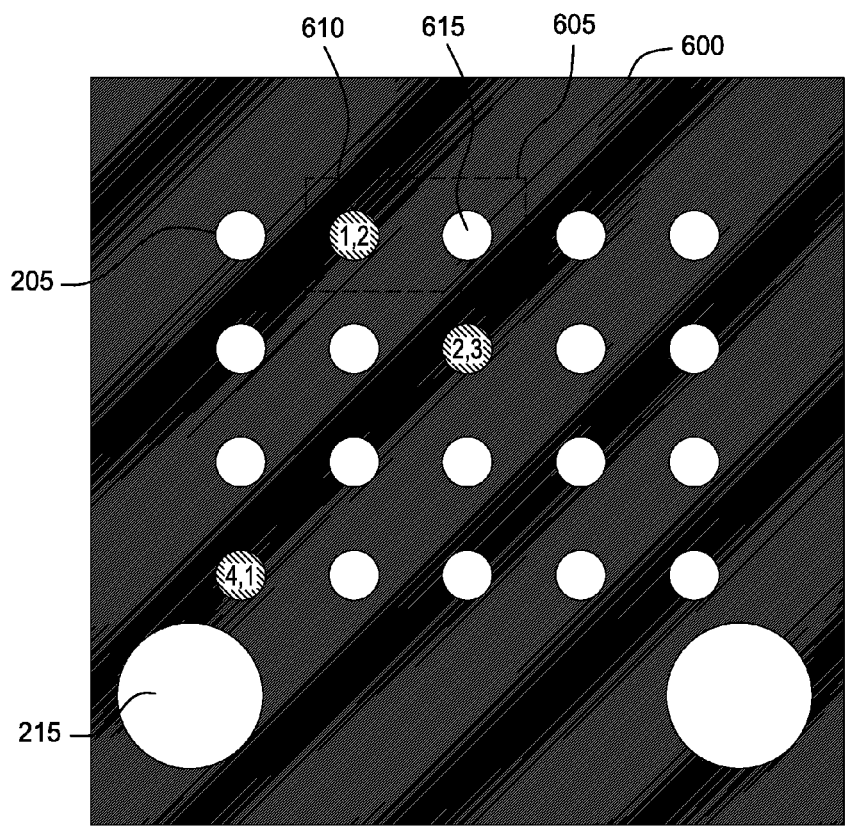
FIG. 6A is a captured image of a slider tray, according to an embodiment described herein.

FIG. 6A is a captured image 600 of a slider tray, according to an embodiment described herein. Specifically, the captured image 600 may be a digital representation of a slider tray 200 supported by the mount 305 shown in FIG. 3. The pockets 205 at row 1, column 2; row 2, column 3; and row 4 column 1 are grayed out to illustrate that they contain a slider. Specifically, pockets occupied by sliders have a less luminance than pockets without sliders. Based on this difference, in one embodiment, the computer vision module may compare the captured image 600 to the template 570 shown in FIG. 5C to determine whether a pocket contains a slider.

Figure 6B:
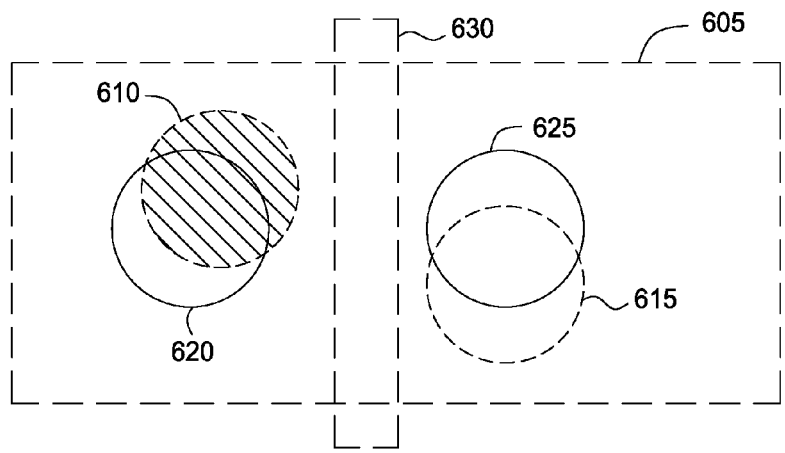
FIG. 6B illustrates a technique for determining whether the slider tray contains a slider, according to an embodiment described herein.

FIG. 6B illustrates pockets 620 and 625 of the template (shown in solid lines) overlaying a portion 605 of the captured image 600 that includes pockets 610 and 615 (shown in dotted lines). Overlaying the two digital images may help to identify the different pocket locations in the captured image 600 and if these pockets contain sliders. As shown, however, the respective pockets in the digital images may not precisely overlap. For example, the slider tray used for generating image 600 may have been subjected to different manufacturing variances than the slider tray used to generate the template, thereby resulting in a different arrangement for pockets 610 and 615 than pockets 620 and 625. Moreover, the tray used to generate the template may be been positioned on the mount differently than the tray used to generate image 600. This human error may also result in the pockets 610 and 615 of captured image 600 not precisely aligning to pockets 620 and 625 in the template.

Despite this misalignment, the template may still be used to identify the pocket locations in the image 600 and determine whether the pockets contain a slider. For example, the computer vision module may scan a region of the image 600 based on the location of pockets 620 and 625 in the template. The computer vision module may have built-in tolerances to account for any difference in the arrangement of the pockets in the two trays. To identify a pocket in image 600, the computer vision module may compare the luminance values of pockets 620 and 625 to the luminance values of the corresponding region in the image 600. If the luminance values are similar, the computer vision module may label the portion as a pocket, assign the pocket to the same row and column number as the pocket in the template, and label the pocket as empty. As shown in FIG. 6B, pocket 615 in image 600 has a luminance value similar to pocket 625 of the template. Thus, the computer vision module may determine that pocket 615 is empty. However, if a region in image 600 that corresponds to a pocket in the template does not have a similar luminance value, the computer vision module may determine that the pocket in the image 600 contains a slider which is occluding the light. As shown in FIG. 6B, in the region of portion 605 proximate to pocket 620 of the template (e.g., pocket 610), the luminance values are less than the luminance value of the pocket 620. Thus, the computer vision module may determine that pocket 610 is currently storing a slider. This comparison may continue until the computer vision module parses through the entire image 600.

In one embodiment, the computer vision module may also compare portions of the template not associated with a pocket (such as the unused space 630 between the rows or columns) to the corresponding regions in the image 600 to see if there are pockets in the image 600 that are missing from the template. If so, the computer vision module may send a message to a user that the template needs to be recalibrated.

Figure 7:
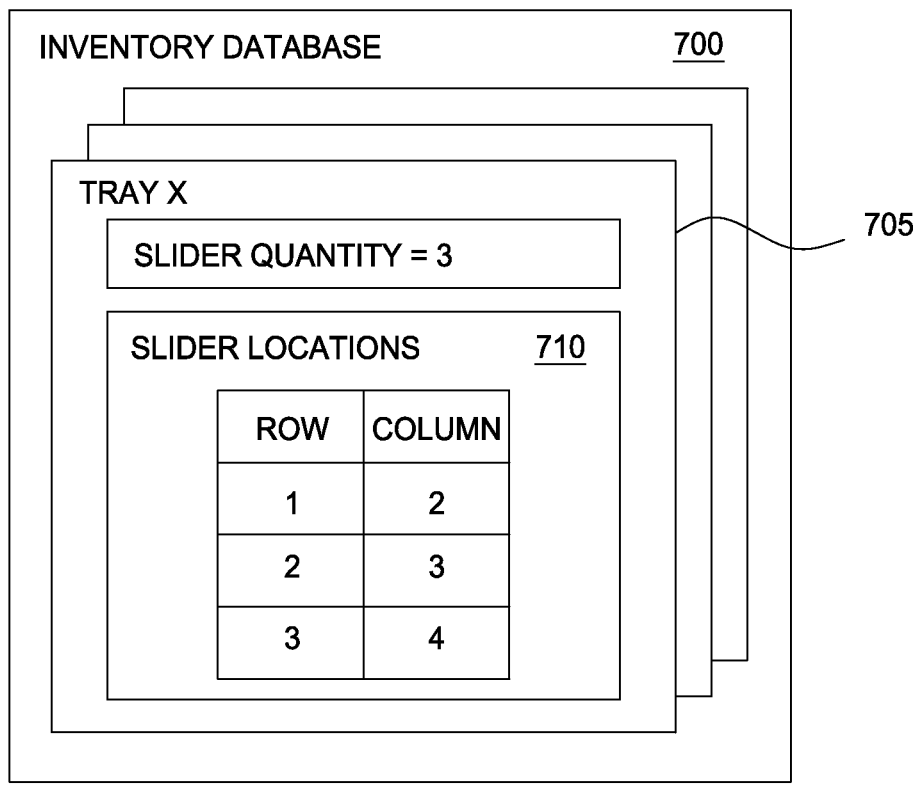
FIG. 7 is a block diagram of an inventory database for sliders, according to an embodiment described herein.

FIG. 7 is a block diagram of an inventory database 700 for sliders, according to an embodiment described herein. The inventory database 700 may maintain a record for each slider tray and the contents of the tray during the manufacturing process. For example, each tray may be marked with a bar code or other identification tag that permits the tray to be uniquely identified and tracked. As shown, database 700 includes an individual entry 705 for each of the slider trays. The entry 705 may contain information about the tray such as the number of sliders stored in the tray as well as the location of each slider in the tray. For example, when the sliders are first loaded into the tray, the corresponding entry 705 in the database 700 may be updated to include the number of sliders and their positions (e.g., row and column).

In one embodiment, the detection system 300 of FIG. 3 may be communicatively coupled to the database 700 in order to confirm or update the entries 705. For example, entry 705 in database 700 may have inaccurate or out of date information that can then be updated based on whether the computer vision module determines that a pocket is empty or occupied. There are at least three different scenarios where the information gathered by the detection system may differ from the data stored in the database 700. First, the computer vision module may determine that a pocket is occupied when the database 700 indicates that the pocket is empty. For example, each slider tray entry 705 includes a slider location table 710 that indicates which pockets (based on row and column values) that are occupied. The content of table 710 may be compared to the information gathered by the computer vision module. Referring to FIG. 6, the computer vision module determined that the pocket at row 4, column 1 is occupied while slider location table 710 does not have an entry for that pocket, and thus, indicates that the pocket is empty. Second, the computer vision module may determine that a pocket indicated as occupied in the slider location table 710 is actually unoccupied. For example, the table 710 indicates that pocket at row 3, column 4 is occupied but the slider tray shown in FIG. 6 illustrates that pocket 4, 3 is empty. Third, the computer vision module may confirm that the information stored in the database 700 is correct. Again referring to FIG. 6, the computer vision module will confirm that the first two entries of the slider location table 710 correctly indicate that the pockets at row 1, column 2 and row 2, column 3 contain sliders.

In the first two scenarios, the information captured by the computer vision module conflicts with the database. In response, an operator or the module may perform an action to resolve the conflict. For example, if the computer vision module finds a slider that is not listed in the database 700, the module may instruct an operator to perform a special procedure that attempts to identify where the extra slider originated. Thus, the computer vision module may identify human or process errors in upstream processing steps. The operator may then update the appropriate entry 705 table to add the slider's location to the slider location table 710. If the sliders are recorded in database 700 but are missing from the actual slider tray, the sliders may be removed from the appropriate slider location table 710, and thus, removed from the inventory.

Figure 8:
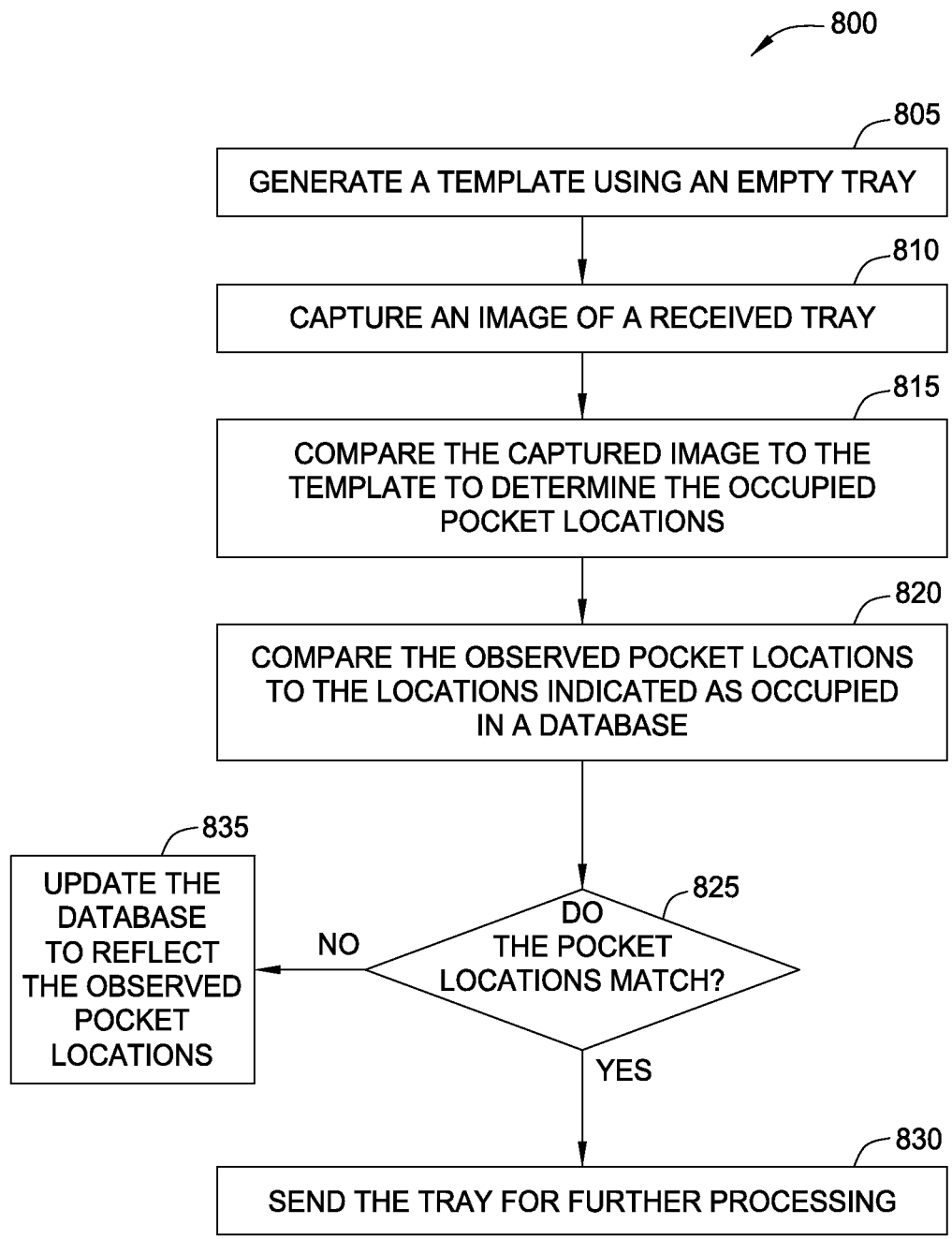
FIG. 8 is a method of comparing observed slider locations to slider locations stored in the inventory database, according to an embodiment described herein.

FIG. 8 is a method 800 of comparing observed slider locations to slider locations stored in the inventory database, according to an embodiment described herein. At block 805, the computer vision module uses an empty slider tray to generate a template (or baseline) model that is then compared to other slider trays. Generally, the template indicates a general or estimated location of each pocket in the slider tray. In one embodiment, the computer vision module may use one or more reference positions and predefined offsets from the reference positions to the individual pockets to identify the individual pockets. In addition to generating the template, the computer vision module may use the reference positions to account for any skew or orientation differences between the image capturing device and the mounted slider tray.

In one embodiment, the computer vision module may perform the calibration and the template process described at block 805 only once for each slider tray type. For example, block 805 may need to be performed again if the operator wishes to use a different slider tray which has either a different number of pockets or arranges the pockets in a different manner. At block 810, the operator may mount a slider tray so that the image capture device can record a digital image of the top surface of the tray. As described above, the mount may include a light source that illuminates the back side of the tray. If a pocket is empty this light is transmitted through the pocket to the front side of the tray and is represented in the captured image as a having a higher luminance value. However, if the pocket is occupied, the slider occludes at least some of the light resulting in a lower luminance value.

At block 815, the computer vision module may use any computer vision technique to identify the empty and occupied pockets using the captured image. For example, the computer vision module may overlay the captured image with the template. If the luminance values are similar, the computer vision module may characterize the corresponding pocket as being empty. If the luminance values are substantially different, however, the computer vision module may characterize the pocket as occupied.

At block 820, the computer vision module may prepare a report that is transmitted to the inventory database or a human operator. This report may include a unique tray identifier based on, for example, a bar code label on the tray, a slider tray type, the total number of sliders in the tray, the pocket location of each occupied pocket, and the like.

If at block 825 the data stored in the database matches the pocket occupancy determined by the computer vision module, the slider tray may be sent for further processing. For example, at block 830, different tests may be performed on the sliders in the slider tray. Eventually the slider are mounted on suspension arms and integrated into hard disk drives. However, if there is a conflict between the information stored in the database and the computer vision module, at block 835, the database or the module may perform an action to correct the problem—e.g., alerting an operator, updating the entries in the database, etc. In this manner, the slider information stored in the database may be updated to reflect the actual pocket locations determined by the computer vision module. Moreover, although not shown in FIG. 8, method 800 may include an additional step where, once the method 800 determines that the information stored in the database is inconsistent with the information gathered by the computer vision module, an operator performs a visual inspection of the slider tray (e.g., using a microscope or other magnification element) to confirm that the conflict actually exists.

Figure 9:
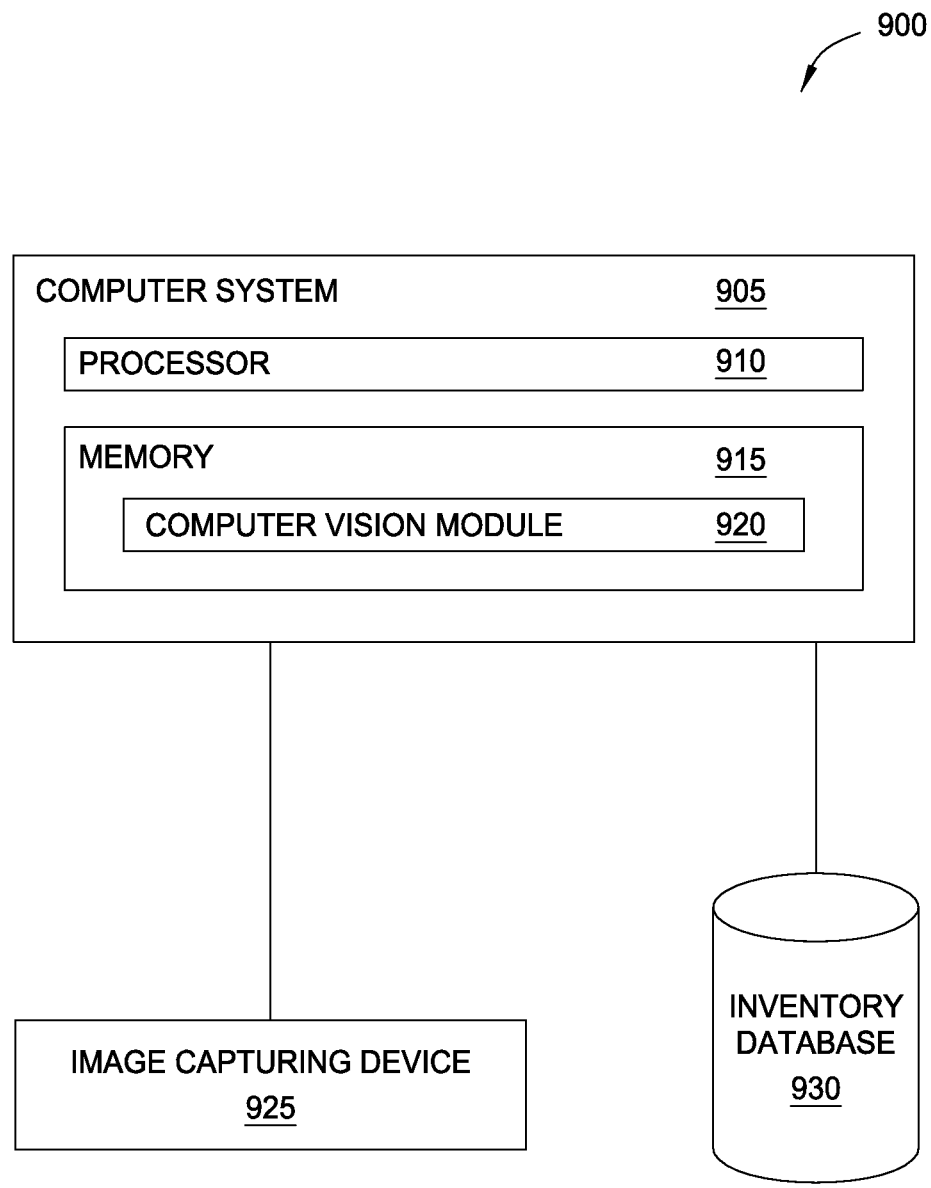
FIG. 9 is a block diagram of a system for updating the inventory database based on observed slider locations, according to an embodiment described herein.

FIG. 9 is a block diagram of a system 900 for updating the inventory database based on observed slider locations, according to an embodiment described herein. System 900 includes computer system 905, image capturing device 925, and inventory database 930. The computer system 905 includes a processor 910 and memory 915. The processor 910 may be any processor capable of performing the functions described herein (e.g., the computer vision techniques described in blocks 805-815 of FIG. 8). In addition, processor 910 may represents one or more processors that may have multiple processing cores. Memory 915 may be volatile or non-volatile memory such as RAM, Flash, EPROM, an internal or external hard disk drive, and the like. Specifically, memory 915 stores the computer vision module 920 that may calibrate the detection system, generate a template based on an empty tray, and determine which pockets in a tray are occupied by sliders by comparing the template to a received digital image. Although shown as a single module 920, these functions may be performed by a plurality of different applications that are located on the same or multiple computer systems.

The computer system 905 is communicatively coupled, either via a wired or wireless connection, to the image capturing device 925. Device 925 may be a digital camera that captures an image of slider tray and transfers the image to the computer vision module 920 for further processing. In one embodiment, the image capturing device 925 may generate a data file that includes the processed image before transmitting the image to the computer system 905. In other embodiments, however, the computer system 905 may transmit raw data to the computer system 905 that converts the data into a digital image of the slider tray.

The computer system 905 is communicatively coupled, either via a wired or wireless connection, to the inventory database 930. The present disclosure is not limited to any particular type of database; instead, any database schema may be used for storing and tracking sliders in a slider tray. As discussed above, the pocket occupancy determined by the computer vision module 920 may be compared with the data stored in the database 930. If there is a conflict, the system 900 may perform an action to correct the conflict such as sending an alert to an operator, repeating the computer vision technique to ensure there was not a mistake, changing the information stored in the inventory database 930, and the like.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

CONCLUSION

A hard disk drive manufacture process may use a database to track the sliders stored within a slider tray. Instead of requiring an operator to visually inspect each tray to confirm that the database information is accurate, the trays may be sent to a detection system that uses a computer vision technique to identify the total number of sliders in a tray. In one embodiment, the computer vision technique may also determine where the sliders are stored in the slider tray—e.g., a particular row and column. If the information obtained using the computer vision technique differs from the information stored in the database, the system may perform one or more actions for correcting the discrepancy. For example, if an entry in the database indicates that a tray should have a slider located at row 1, column 2 but the computer vision technique indicates that this location is actually empty, the entry may be updated to reflect that the slider has been removed. In this manner, the computer vision technique may be used to update and confirm the slider tracking information stored in the database.

While the foregoing is directed to embodiments of the present invention, other and further embodiments of the invention may be devised without departing from the basic scope thereof, and the scope thereof is determined by the claims that follow.

What is claimed is:

1. A method of tracking a disk drive component, comprising:
   generating a template using a first tray that is not currently storing any disk drive components, wherein the first tray comprises a plurality of apertures configured for respectively storing an individual disk drive component;
   receiving an image of a second tray that contains one or more disk drive components;
   determining a number of disk drive components stored in the second tray by comparing the received image to the template;
   comparing the determined number of disk drive components to a disk drive quantity stored in a database entry associated with the second tray; and
   upon determining that the number of disk drive components is different than the disk drive quantity, selecting an action that, when performed, updates the database entry.

2. The method of claim 1, wherein the plurality of apertures in the first tray and a plurality of apertures in the second tray are arranged in rows and columns, wherein the first tray comprises at least one reference position that is used when generating the template.

3. The method of claim 2, wherein the reference position is used to compensate for an orientation misalignment between an orientation of the first tray on a mount and an orientation of an image capturing device that records the image.

4. The method of claim 1, further comprising:
   determining a unique location of each disk drive component in the second tray by comparing the received image to the template;
   comparing the unique location to a location table in the database entry associated with the second tray; and
   upon determining that the unique location is not contained within the location table, selecting an action that updates the location table to include the unique location.

5. The method of claim 4, upon determining that the location table stores a disk drive component location that does not correspond to any of the unique locations, removing the disk drive component location from the location table.

6. The method of claim 1, wherein the disk drive component is a slider comprising a write portion for writing data to a magnetic media and a read portion for reading data from the magnetic media.

7. The method of claim 1, wherein the action is at least one of: altering an operator of the difference between the number of disk drive components and the disk drive quantity and updating the database entry.

8. A system for tracking disk drive components, comprising:

a first tray including a plurality of apertures configured for respectively storing an individual disk drive component;

a second tray for storing at least one of the disk drive components;

an image capturing device configured to capture digital images of the first tray and second tray;

a computer vision module for receiving the digital images, wherein the computer vision module is configured to:

generate a template using a digital image of the first tray;

determine a number of disk drive components stored in the second tray by comparing the received image to the template;

compare the determined number of disk drive components to a disk drive quantity stored in a database entry associated with the second tray; and upon determining that the number of disk drive components is different than the disk drive quantity, select an action that, when performed, updates the database entry.

9. The system of claim 8, wherein the plurality of apertures in the first tray and a plurality of apertures in the second tray are arranged in rows and columns, wherein the first tray comprises at least one reference position that is used when generating the template.

10. The system of claim 9, wherein the reference position is used by the computer vision module to compensate for an orientation discrepancy between an orientation of the first tray on a mount and an orientation of the image capturing device.

11. The system of claim 8, wherein the computer vision module is further configured to:

determine a unique location of each disk drive component in the second tray by comparing the received image to the template;

compare the unique location to a location table in the database entry associated with the second tray; and upon determining that the unique location is not contained within the location table, select an action that updates the location table to include the unique location.

12. The system of claim 11, wherein the computer vision module is further configured to, upon determining that the location table stores a disk drive component location that does not correspond to any of the unique locations, remove the disk drive component location from the location table.

13. The system of claim 8, further comprising a database comprising a plurality of database entries, wherein the database is configured to maintain a database entry of the plurality of database entries that corresponds to the second tray.

14. The system of claim 8, wherein the disk drive component is a slider comprising a write portion for writing data to a magnetic media and a read portion for reading data from the magnetic media.

15. A computer program product for tracking a disk drive component in a power plant, the computer program product comprising:

a non-transitory computer-readable storage medium having computer-readable program code embodied therewith, the computer-readable program code being configured to:

generate a template using a first tray that is not currently storing any disk drive components, wherein the first tray comprises a plurality of apertures configured for respectively storing an individual disk drive component;

receive an image of a second tray that contains one or more disk drive components;

determine a number of disk drive components stored in the second tray by comparing the received image to the template;

compare the determined number of disk drive components to a disk drive quantity stored in a database entry associated with the second tray; and upon determining that the number of disk drive components is different than the disk drive quantity, select an action that, when performed, updates the database entry.

16. The computer program product of claim 15, wherein the plurality of apertures in the first tray and a plurality of apertures in the second tray are arranged in rows and columns, wherein the first tray comprises at least one reference position that is used when generating the template.

17. The computer program product of claim 16, wherein the reference position is used to compensate for an orientation misalignment between an orientation of the first tray on a mount and an orientation of an image capturing device that records the image.

18. The computer program product of claim 15, wherein the computer-readable program code is further configured to:

determine a unique location of each disk drive component in the second tray by comparing the received image to the template;

compare the unique location to a location table in the database entry associated with the second tray; and upon determining that the unique location is not contained within the location table, select an action that updates the location table to include the unique location.

19. The computer program product of claim 18, wherein the computer-readable program code is further configured to, upon determining that the location table stores a disk drive component location that does not correspond to any of the unique locations, remove the disk drive component location from the location table.

20. The computer program product of claim 15, wherein the disk drive component is a slider comprising a write portion for writing data to a magnetic media and a read portion for reading data from the magnetic media.

\* \* \* \* \*